United States Patent
Wilson et al.

(10) Patent No.: US 7,565,876 B2
(45) Date of Patent: Jul. 28, 2009

(54) MARINE VESSEL CONTROL SYSTEM

(76) Inventors: Jim Wilson, 810 Pembroke, White Lake, MI (US) 48326; Scott Snow, 3600 Shirley St., Commerce, MI (US) 48390

( * ) Notice: Subject to any disclaimer, the term of this patent is extended or adjusted under 35 U.S.C. 154(b) by 0 days.

(21) Appl. No.: 11/426,028

(22) Filed: Jun. 23, 2006

(65) Prior Publication Data
US 2007/0078575 A1    Apr. 5, 2007

Related U.S. Application Data

(60) Provisional application No. 60/749,820, filed on Dec. 13, 2005, provisional application No. 60/693,284, filed on Jun. 23, 2005.

(51) Int. Cl.
- *B63B 39/00* (2006.01)
- *B63B 39/06* (2006.01)
- *B63H 20/00* (2006.01)
- *B63H 20/08* (2006.01)
- *B63H 25/00* (2006.01)

(52) U.S. Cl. .................. 114/122; 114/144 R; 440/1; 440/53

(58) Field of Classification Search ............... 440/1, 440/53, 57–60, 61 S, 61 T; 114/144 RE, 114/122, 144 R; 701/21
See application file for complete search history.

(56) References Cited

U.S. PATENT DOCUMENTS

| | | | | |
|---|---|---|---|---|
| 4,261,278 A | * | 4/1981 | Gaudin | 114/126 |
| 4,757,971 A | * | 7/1988 | Mapes | 248/642 |
| 5,941,189 A | * | 8/1999 | Johansson | 114/61.1 |
| 6,273,771 B1 | * | 8/2001 | Buckley et al. | 440/84 |

* cited by examiner

*Primary Examiner*—Ajay Vasudeva
(74) *Attorney, Agent, or Firm*—Gifford, Krass, Sprinkle, Anderson & Citkowski, P.C.

(57) ABSTRACT

A marine vessel control system includes a primary marine propulsory mechanism attached to the vessel and an intelligent vessel control system. Also included is an attitude sensor linked with the intelligent vessel control system. An actuating system responding to an output of the intelligent vessel control system is linked with the primary marine propulsory mechanism for adjusting a trust vector of the primary marine propulsory mechanism.

8 Claims, 8 Drawing Sheets

FIG.8

MARINE VESSEL CONTROL SYSTEM

RELATED APPLICATIONS

This application claims priority of U.S. Patent Provisional Applications Nos. 60/693,284 filed Jun. 23, 2005 and 60/749,820, filed Dec. 13, 2005 which are incorporated herein by reference.

FIELD OF THE INVENTION

The invention relates to marine vessel control systems.

BACKGROUND OF THE INVENTION

In addition to forward and reverse, today's vessels, depending on the specific capabilities of their primary propulsory mechanism(s), employ thrust vector(s) for basic vertical axis pitch control and/or horizontal axis steering control. Today's primary propulsion vertical and horizontal axis thrust vectors exists as functionally independent nonintegrated forces, thus are ineffective when compared to their potential if fused together within an advanced synergistic vessel control system with fully-integrated primary propulsion attitude and steering authority. Today's vessels could realize significantly improved overall performance and stability, in all operating conditions, by employing coordinated, computer controlled dynamic thrust vector manipulation of their primary propulsory mechanisms.

According to one aspect, a marine vessel control system for controlling the movement of a vessel includes at least one primary marine propulsory mechanism that provides a thrust vector and is movably attached to the vessel to manipulate the orientation of the thrust vector and affect the attitude of the vessel. The marine vessel control system also includes a servo control. An actuating system is coupled to the propulsory mechanism and actuates the propulsory mechanism relative to the vessel. At least one attitude sensor provides a signal indicating the attitude of the vessel. A central control computer is operatively coupled to the servo control, the actuating system and the attitude sensor and controls the actuation of the propulsory mechanism to adjust the thrust vector of the at least one primary marine propulsory mechanism in response to the signal from the attitude sensor indicating the attitude of the vessel wherein the attitude and motion damping in any or all of the pitch, roll and yaw axes of the vessel are controlled.

According to another aspect, a marine vessel control system for controlling the movement of a vessel includes at least one primary marine propulsory mechanism that provides a thrust vector and is movably attached to the vessel to manipulate the orientation of the thrust vector and affect the attitude of the vessel. The marine vessel control system also includes a servo control. At least one hydrodynamic effector is movably attached to the vessel. An actuating system is coupled to the propulsory mechanism and the at least one hydrodynamic effector and actuates the propulsory mechanism and hydrodynamic effector relative to the vessel. At least one attitude sensor provides a signal indicating the attitude of the vessel. A central control computer is operatively coupled to the servo control, the actuating system and the attitude sensor and controls the actuation of the propulsory mechanism and hydrodynamic effector to adjust the thrust vector of the at least one primary marine propulsory mechanism and a position of the hydrodynamic effector in response to the signal from the attitude sensor indicating the attitude of the vessel wherein the attitude and motion damping in any or all of the pitch, roll and yaw axes of the vessel are controlled.

SUMMARY OF THE INVENTION

Accordingly, the vessel control system of the present invention solves the limitations of typical marine vessel performance and stability with computer coordinated manipulation of one or more independently actuated and articulated primary propulsory thrust vectors resulting from dynamically changing the angle of the propulsory mechanism. Employing this novel system in a differential or asymmetric manner as an active method to control vessel attitude and stability, regardless of speed, is a highly efficient and practical method for maximizing the effectiveness of primary propulsion systems by much more effectively harnessing the thrust they generate.

Dynamic vector control can advantage and be effectively integrated with primary marine propulsion systems including, but not limited to, outboards, outdrives, sterndrives, waterjet drives, etc., in which the thrust vector resulting from the angle of the propulsory mechanism can, at a minimum, be vertically articulated to induce both positive and negative pitch trim. The resulting novel system, especially when combined with active differentially managed hydrofoil devices such as trim tabs, will maximize overall vessel responsiveness, maneuverability, stability, ride quality, attitude control, fuel economy, speed and safety.

DETAILED DESCRIPTION OF THE PREFERED EMBODIMENTS

Definitions

Differential and differentially are defined within this document as unequal, off center and/or involving differences in: angle, speed, rate, direction, direction of motion, output, force, moment, inertia, mass, balance, application of comparable things, etc.

Primary propulsion and primary propulsory are defined as the main thrust generating propulsion system(s), mechanism(s) and device(s) employed to provide thrust vectors to propel a vessel throughout low, medium and high speed translation operations and/or control vehicle attitude. Low-speed maneuvering thrusters and other similar secondary trust generating devices do not apply to this specific definition.

Dynamic and dynamically are defined as immediate actions that take place at the moment they are needed; used in describing interactive hardware and software systems involving conflicting forces; characterized by continuous change and activity.

Vessel attitude is defined relative to three rotational axes: pitch attitude (rotation about the y or sway-axis); roll attitude (rotation about the x or surge-axis); yaw attitude (rotation about the z or heave-axis).

Referring to FIGS. 1-8, one or more primary propulsion devices 10 are independently controlled by an intelligent vessel control system 12 which is operable to dynamically manage trust vector angle(s) in a differential or parallel manner, over the entire range of vessel performance and operation. The one or more primary propulsory devices 10 must be at least capable of vertical axis pitch articulation.

In the illustrated embodiment, the primary propulsion devices 10 are shown in the form of outboard motors for driving water vessel. The intelligent vessel control system 12 may, however, be readily adapted to control articulation of other primary marine propulsion systems including outdrives, sterndrives, waterjet drives, and the like. The vessel control system 12 dynamically articulates the one or more propulsion devices to control their respective thrust vector angles 14. The thrust vector resulting from the angle of one or more primary propulsory mechanisms 10 can, at a minimum, be vertically articulated in a dynamic manner to induce both positive and negative pitch trim. Coordinated dynamic manipulation of multiple, independently actuated and articulated thrust vectors resulting from changing the angle of the propulsory mechanism 10 in a differential or asymmetric manner as an active method to control vessel attitude and stability, regardless of speed, is a novel approach for maximizing the effectiveness of primary propulsion systems by much more effectively harnessing the thrust they generate.

Figure 7:
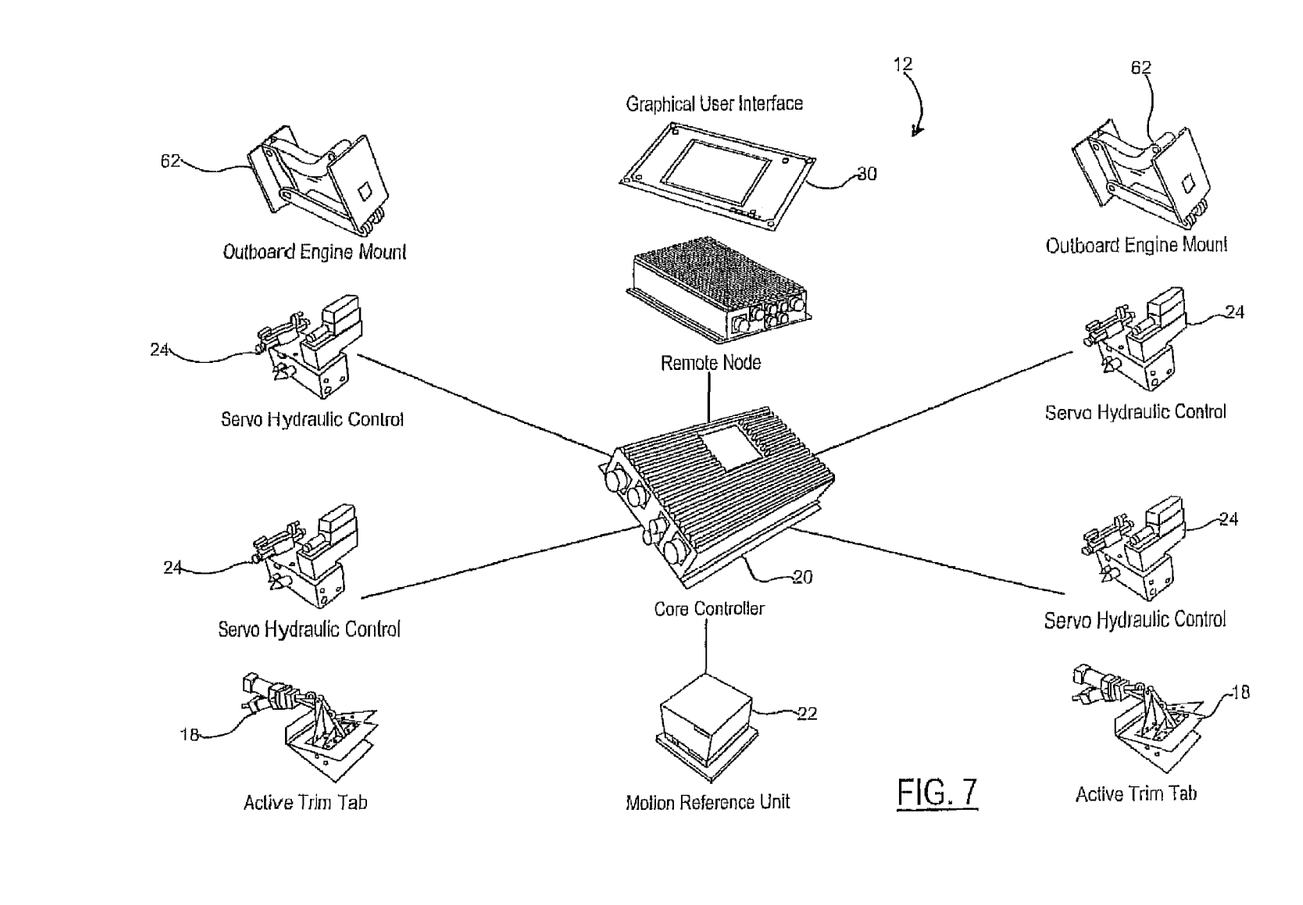
FIG. 7 is a diagram detailing the interaction of a marine control system for a vessel having dual outboard propulsory mechanisms.

As best shown in FIG. 7, the vessel control system 12 electronics package is a fully distributed automation and control system, integrating an intelligent central control computer package 20 with vessel motion sensors 22 and servo hydraulic control outputs 24, although other suitable actuation mechanisms can be utilized, providing real-time automatic integrated control of a vessel's main operating parameters. The central control computer 20 executes ride control algorithms and coordinates system activity. Sensors 22 located throughout a vessel transmit real-time motion data (attitude, rate, acceleration, etc.) to the central control computer 20. Additional sensors monitor exact positioning and condition of the vessel's individual operating parameter directly influenced by the vessel control system 12. This information is processed and precise instructions are communicated to individual servo controllers 24 responsible for specific vessel operating parameters or effectors, such as individual thrust vector angle, thrust velocity, engine output, drive engagement and gear selection, trim tab deflection, rudder position, etc. These parameters are electronically monitored and controlled by the vessel control system 12 and can be actuated hydraulically, electrically or with other suitable mechanisms. Some of the basic real-time performance capabilities of the vessel control system 12 include: trim stabilization and pitch damping; list stabilization and roll damping; yaw damping and turn coordination, etc. An operator interacts with the vessel control system 12 through a user interface 30 which can employ a number of different electronic and/or mechanical control input and system monitoring devices such as: Graphical User Interface (GUI) displays and/or touch screens; gauge instruments; voice command and alert interfaces; keyboards; joysticks; steering wheels; throttles; switches; dials; etc. The user interface 30 communicates the vessel control system's current operational status, current vessel setup, logged operational data, etc. Some of what the user interface allows the operator to do is: select automatic or manual operating modes; set The desired running trim and list of the vessel; increase or decrease the gain settings for pitch and roll control functions; select between flat and coordinated turns; etc.

For more advanced vessel integrations, control system software contains a thoroughly defined map of a specific hull form's drag characteristics based on attitude and displacement variables. The software forms part of the control logic for steering, stability, attitude, speed, acceleration and fuel economy. A series of prime directives, such as safety, stability and maximum fuel economy per speed condition are resident in the vessel control logic defined in the software. As an operator or autopilot advances and retards throttle settings to affect speed, the vessel control system 12 compares stored hull drag and displacement data to real-time information gathered by the onboard sensor package. This information is used to correct vessel attitude and displacement based on the resident control logic directives. A vessel's attitude can have a tremendous impact on its performance and efficiency during operation. Depending on vessel design and available equipment, control logic determines the combination of parameters or resources such as thrust vector angle(s), engine output, trim tab deflection, rudder position, ballast distribution, etc., necessary to maintain, optimize or achieve specific performance objectives. For example, with information acquired from an external GPS data source, an operator can identify a destination and desired arrival time while in route; control logic will select the best economy engines capable of maintaining the schedule, to include starting or pulling off-line powerplants the system determines either necessary or unnecessary for the defined mission; manage throttle settings and required speed; and steer the course either by conventional means utilizing a rudder, or with asymmetric drag and differential thrust vectoring and velocity.

Asymmetrical drag steering takes advantage of the vessel control system's ability to precisely control roll and, as a result, induce a turning moment by increasing wetted surface area asymmetrically on one side of the hull or the other. Just as drag increases with vessel speed, so does the turning force generated by differential lateral wetted surface area. Mapping the drag characteristics of a specific hull form based on pitch, roll and displacement variables is necessary to reliably predict the asymmetric influence and employ it as a practical steering system. In addition to asymmetrical drag steering, the vessel control system can integrate with, and electronically control, other steering devices such as conventional rudders, vectored thrust, steerable drives, etc.

Vessel control system 12 integration with a resident thrust vectoring steer-by-wire capability allows for practical application of differential steering. Along with traditional course management, a differential capable thrust vectoring steer-by-wire system can be employed during certain maneuvers and/or conditions for desired effect. Example maneuvers are: controlled lists at idle forward progress; crabbing; lateral sway translation (sideways movement) without assistance from bow and/or stern thrusters; power-on breaking (accomplished by counter-rotating multi-propulsory mechanisms on their horizontal axis at a uniform rate in order to neutralize thrust forces until vector angles are pointing in the opposite direction of travel); drift control; etc. When integrated with a joystick or similar adequate operable device, an operator can easily maneuver a vessel in all directions at low speed for precision navigation in challenging low tide environments to convenient docking in congested areas.

As described above, the control system 12 can manipulate multiple thrust vectors generated by the propulsion devices 10 in a dynamic manner in response to inputs received by the sensors 22 to control vessel attitude. The vessel control system 12 has demonstrated attitude control and/or maneuvers that are not known to have been accomplished prior. The first, a "flat turn" is accomplished by instructing the vessel control system 12 to maintain a neutral or level deck attitude while turning. The sensors 22 provide input to the central computer 20 indicating vessel attitude. The central computer 20, in response to the inputs from the sensors 22, actuates the propulsions devices 10 to produce the necessary vectors to maintain a level or "flat" attitude of the vessel through a turn. Alternatively, the system 12 may also actively and dynamically control tabs and/or rudders 18 in combination with the propulsion devices 10. Thus, the combination of differential vertical axis thrust vector authority provided by the control system 12 and appreciable force imparted by the active differential trim tabs 18 results in this capability to provide the desired vessel attitude through a particular maneuver, such as the flat turn. The byproduct of the "flat turn" is a significant reduction in wetted surface area as compared to what a similar vessel would experience as a result of leaning into turns and forcing a larger area of the hull into the water. Increasing wetted surface area for an extended period during a turn results in speed loss. The vessel control system 12 eliminates leaning in turns and, as a result, does not experience the same level of speed loss. Another byproduct of the "flat turn" is a significant reduction in turning radius. Current experience is as much as 50% turning radius reduction during testing.

Another capability of the vessel control system 12 resulting from its differential thrust vector and active trim tabs is a reluctance to fishtail. Testing at speeds as high as 35 knots with hard entry into tight turns with full stop steering input could not break the test vessels stern loose.

Experience with the vessel control system's unique stability capabilities, inspired development of control logic for automated active roll-over prevention. The vessel control system 12 is able to identify conditions whereby a vessel is exceeding specific design and/or safe operating limits with respect to stability. The vessel control system 12 reacts irrespective of cause; operator error, hazardous environmental conditions, or otherwise. Active, dynamic countermeasures are employed by the vessel control system 12 including, but not limited to, thrust vector and velocity manipulation, trim tab deflection, etc., in order to reestablish control of the vessel.

Figure 1A:
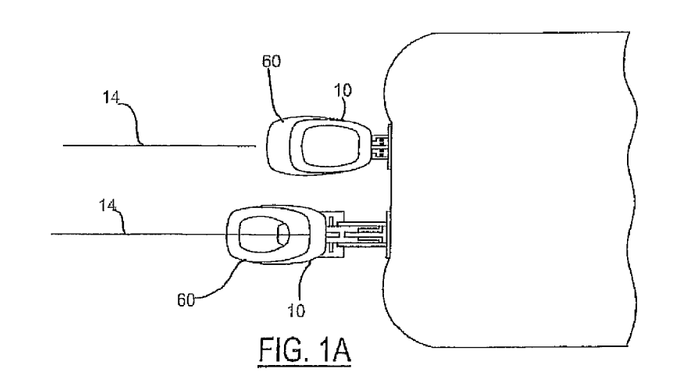
FIG. 1A-D are views of a vessel detailing the thrust vectors of a dual outboard propulsory mechanism.
Figure 1B:
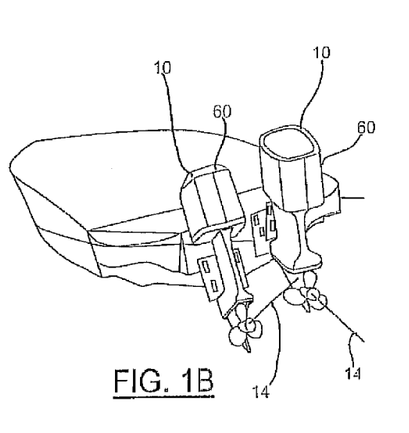
Figure 1C:
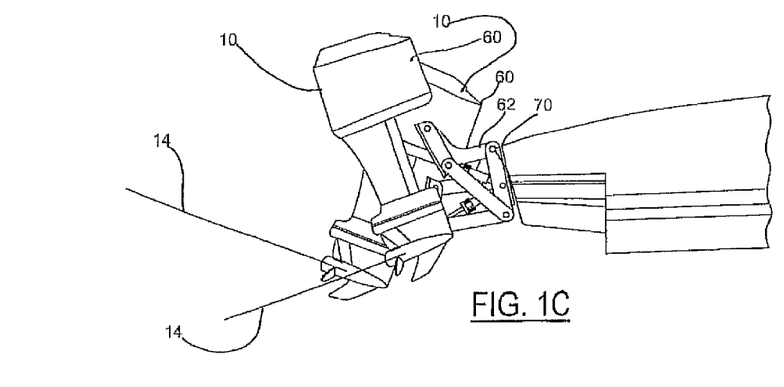
Figure 1D:
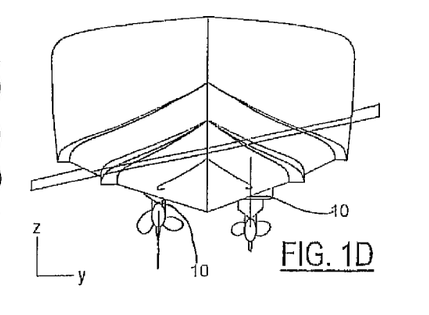
Figures 2, 3:
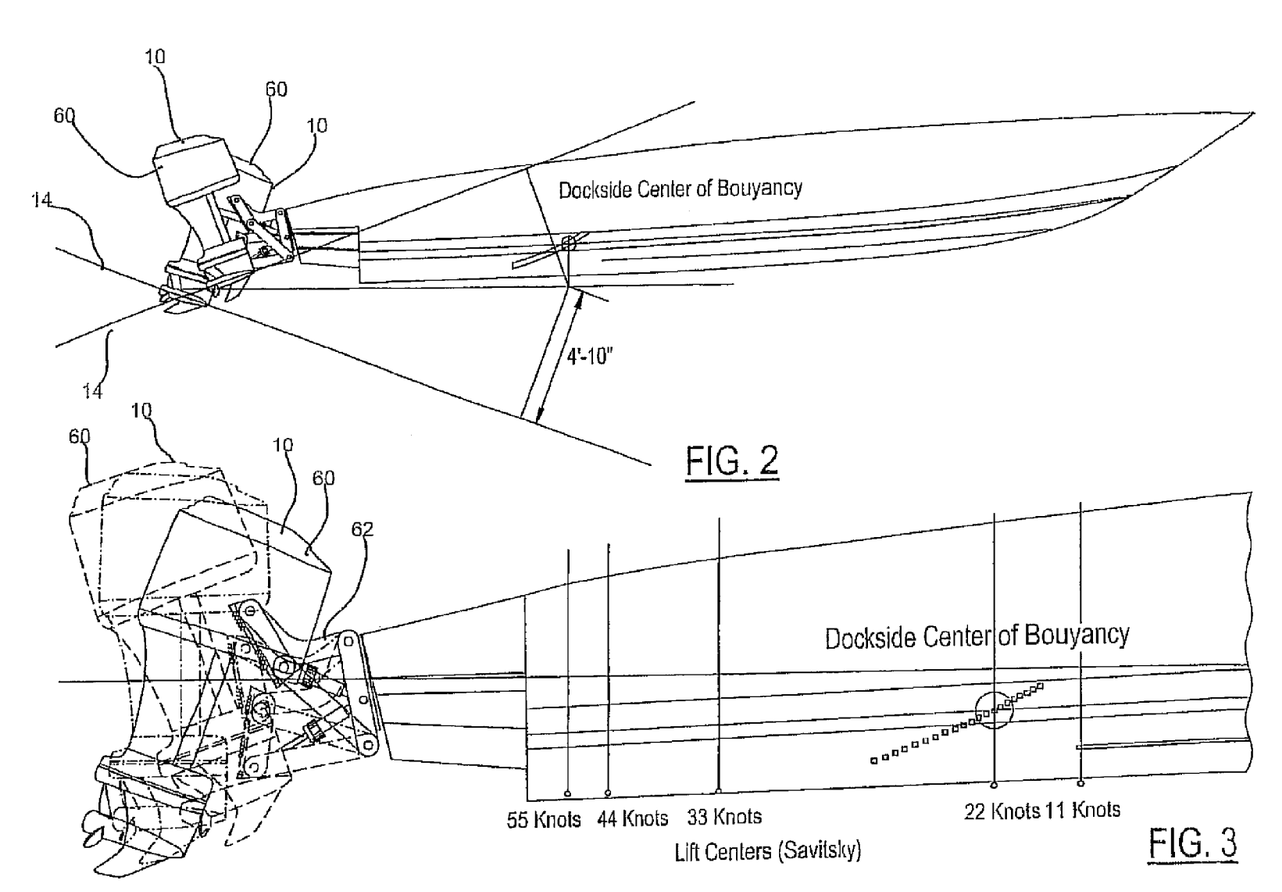
FIG. 2 is a side view of a vessel detailing the thrust vector relative to a center of buoyancy for a dual outboard propulsory mechanism.
FIG. 3 is a partial side view of a vessel detailing the hull mapping of the vessel.
Figure 4:
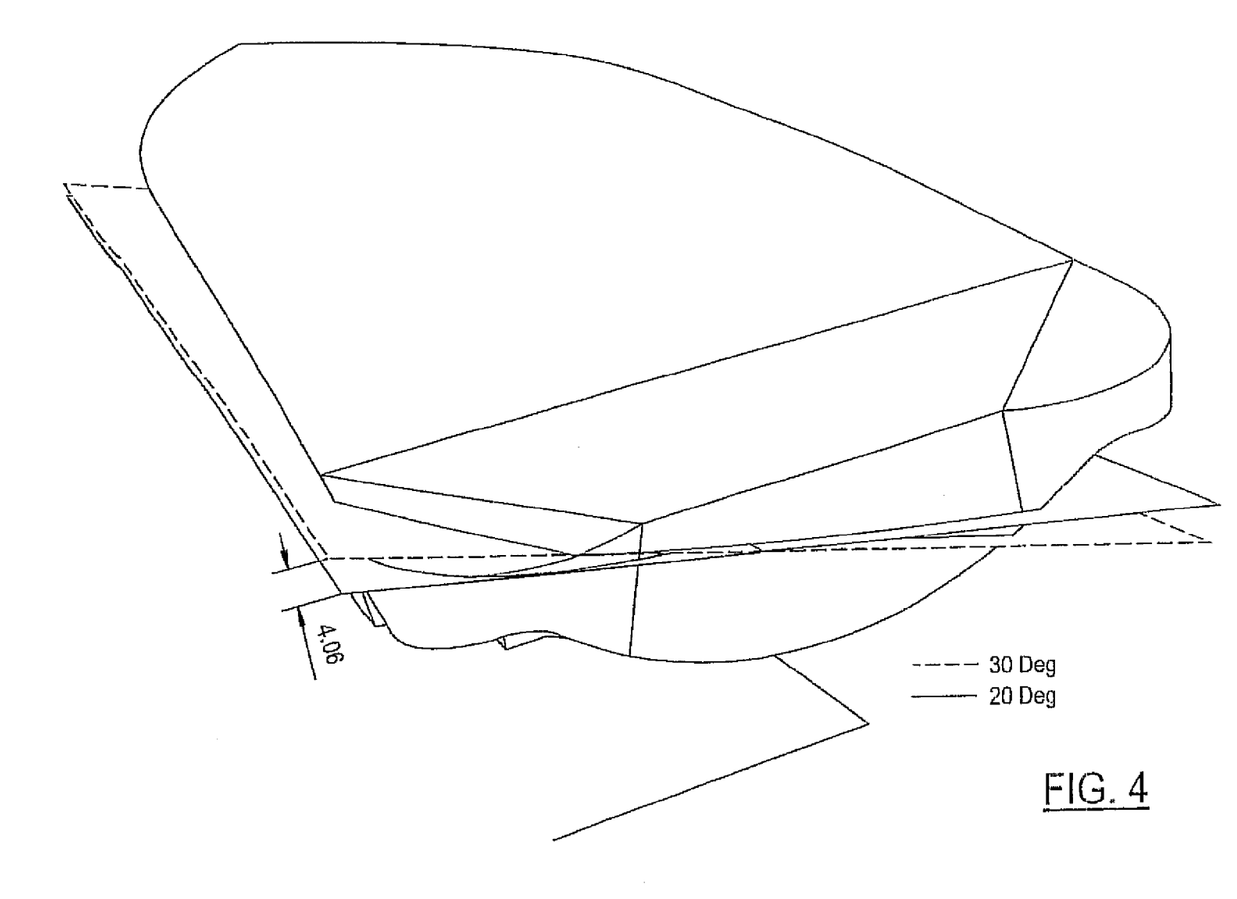
FIG. 4 is perspective view of a vessel showing a controlled list.
Figures 5A, 5C:
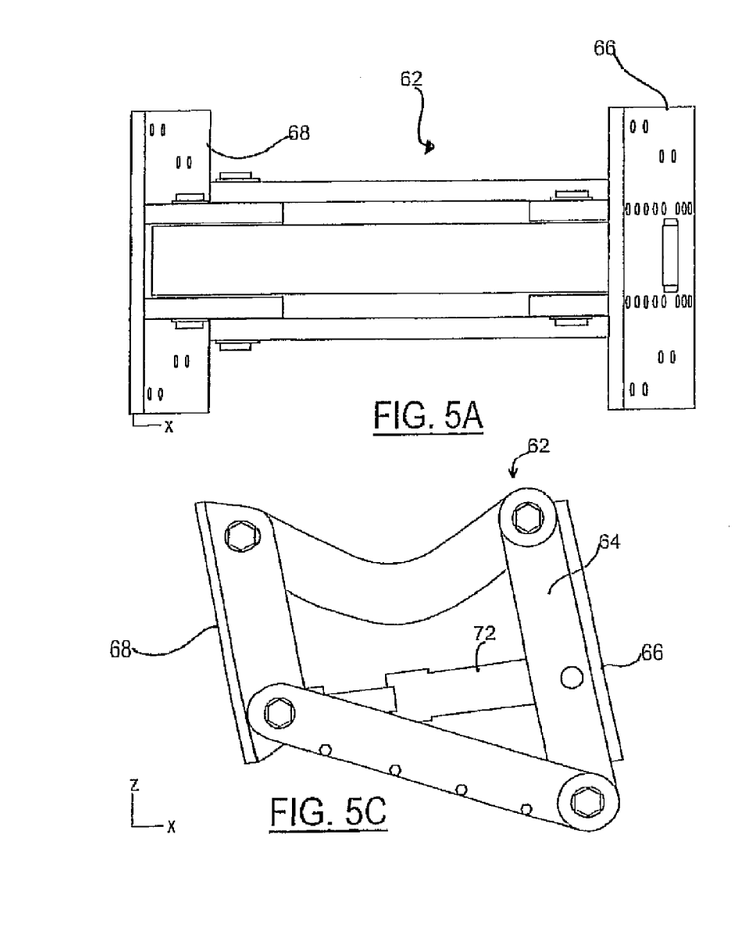
FIG. 5A-D are views detailing a four bar linkage for use with an outboard propulsory mechanism.
Figure 5B:
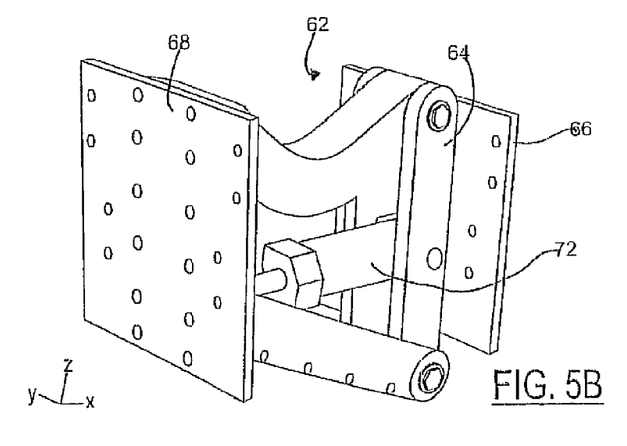
Figure 5D:
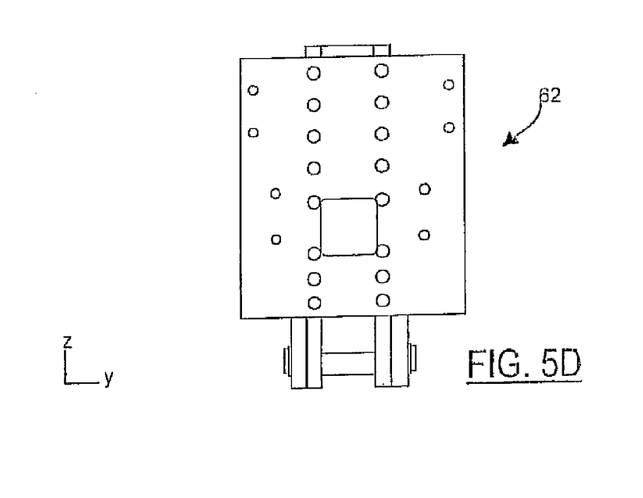
Figures 6A, 6B:
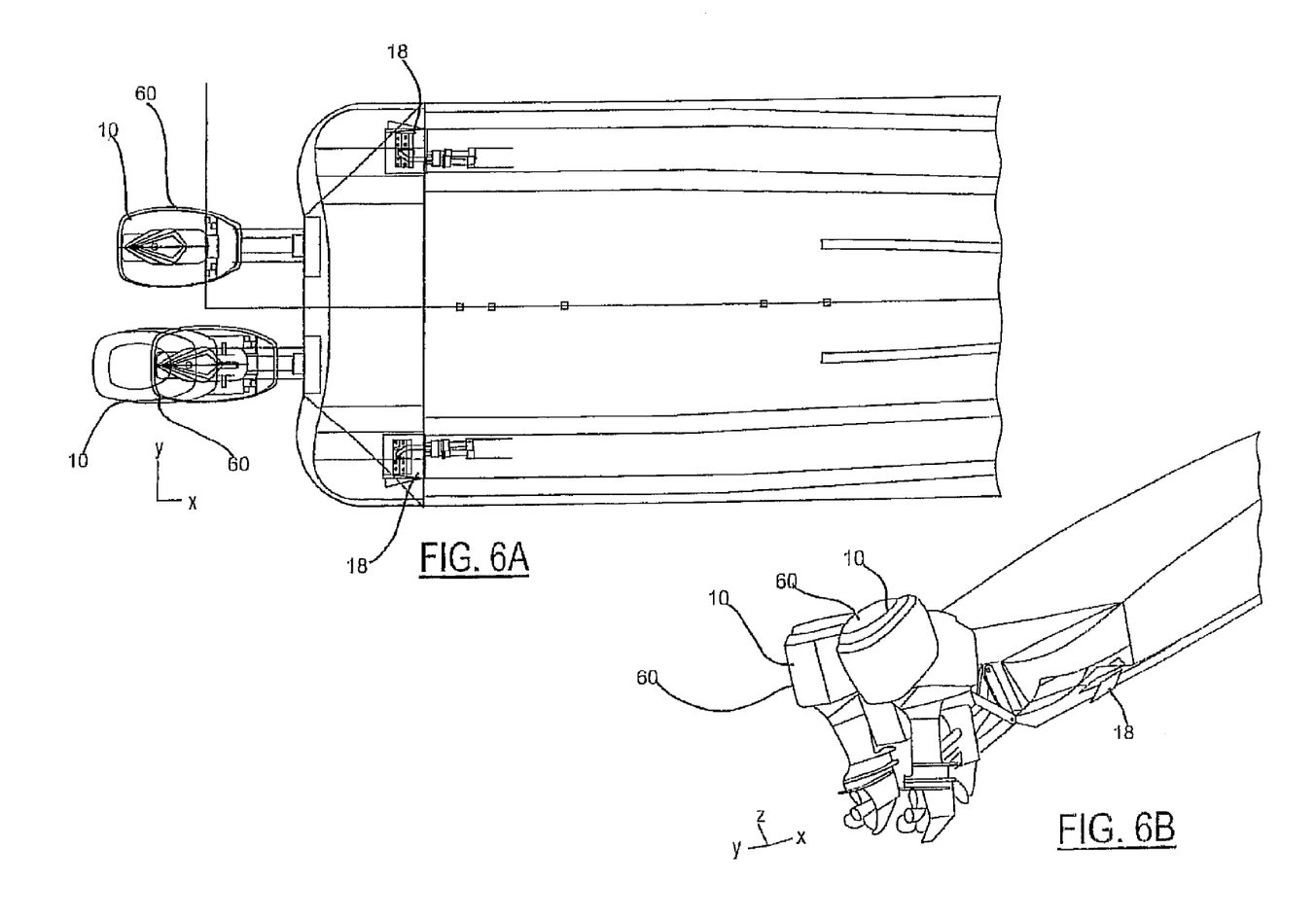
FIG. 6A-D are views of a vessel including dual outboard propulsory mechanism and trim tabs.
Figures 6C, 6D:
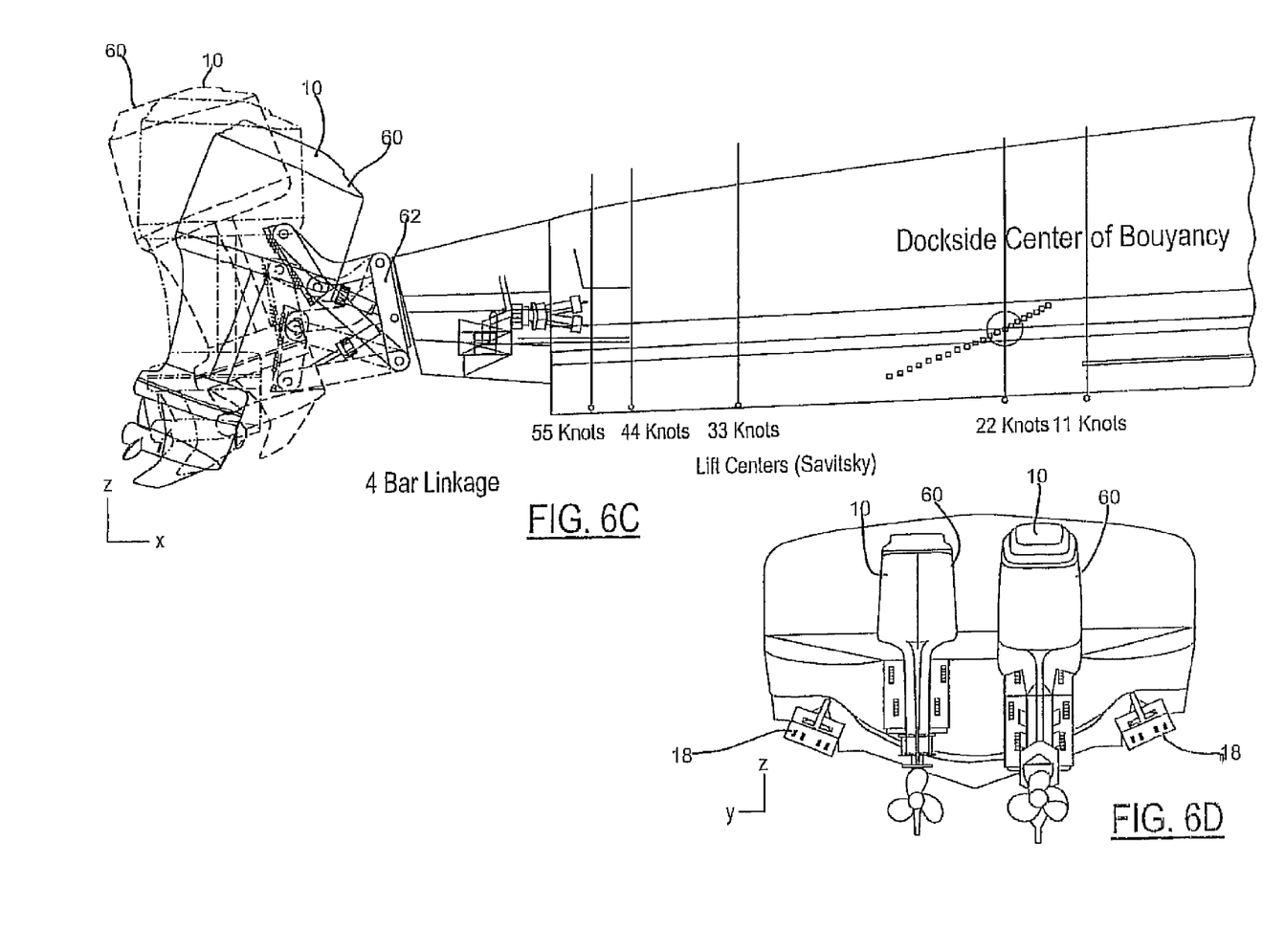

As shown in FIG. 4, another novel capability of the vessel control system, based on differential manipulation of multiple independently actuated and articulated thrust vectors, is its ability to roll the vessel and sustain a controlled list while the vessel is sitting motionless in the water. The control system 12 can maintain the list as the vessel gets underway and can hold it at speed for as long as the operator requires and conditions permit. The significance of this unique capability becomes clear during flooding emergencies following any incident resulting in damage near, along or below the waterline. The operator precisely controls list angle, in 1/10 (0.1) degree increments, via the vessel control system user interface described earlier within this document. As part of a specific vessel's integration, the emergency procedures required to implement an idle list maneuver can be automated in order to reduce reaction time. In order to relax or unload the propulsion requirement, the vessel control system 12 can be integrated with and deploy onboard fuel and water transfer pumps to assist in attitude control by creating ballasts wherever necessary for the desired mode and effect.

The vessel control system 12 supports integration with navigational and collision avoidance technologies, such as GPS, radar, downloadable satellite information, etc., in order to optimize the system's operational capabilities.

The vessel control system 12 is capable of dynamically integrating hydrofoil and/or planning devices such as t-foils and tabs 18 into a specific installation's overall stability, attitude and steering solution. For example, differentially articulated trim tabs can be used when controlling or damping roll under certain conditions. The vessel control system 12 determines based on the effectors at its disposal, which to deploy for a desired result. Per condition, control logic analyzes its options and deploys one or more selected mechanisms, differentially or in parallel, based on the most efficient method for achieving operator or autopilot directed objectives.

As shown in FIGS. 1-3 and 5, 6 and 7 the system may be adopted for use with outboard motors 60. A four-bar-linkage support bracket 62 is provided to permit rapid adjustment of the thrust vector angle and to permit sufficient undertrim. The bracket 62 has a support arm 64 extending aft from a transom plate 66 and an engine mounting bar 68 pivotally mounted to the support arm 64. The transom plate 66 is mounted to the transom 70 and an actuator 72 extends from a lower portion of the transom plate 66 to the mounting bar 68. The actuator 72 may be any suitable means of pivoting the support arm 64, such as a ball-screw actuator, hydraulic cylinder, etc., capable of supporting drive/propulsion unit thrust vector angle changes in the magnitude of 50 to 60 degrees per second. Electro-hydraulic control activated hydraulic cylinders or alternative actuating mechanisms may be utilized to respond to precise positioning instructions received from the vessel control system. Depending on the installation specific requirements, the preferred embodiment employs either mechanical or electrical pumps to generate and sustain the hydraulic pressure necessary for articulating the outboard motors 60 and additional control surfaces such as trim tabs. It should be realized that other suitable pump and actuation mechanisms can be utilized. The example embodiment incorporates one hydraulic pump and one hydraulic accumulator per outboard. The mechanical extraction hydraulic pumps are mounted directly to, and driven by, the outboard motors 60.

The outboard motor 60 is mounted to the mounting bar 68 in a conventional manner. However, the length of the arm 68 is such that the motor 60 may be moved towards the transom 70 a sufficient distance to permit the thrust vector created by the propeller shaft angle to move as much as 45 degrees undertrim from a horizontal position. In this way, the propellers or thrust vectors can be moved rapidly by the control system 12 to stabilize the boat. The mount articulates in such a way as to maintain a near uniform thrust vector height relative to the horizontal plane of the vessel.

Figure 8:
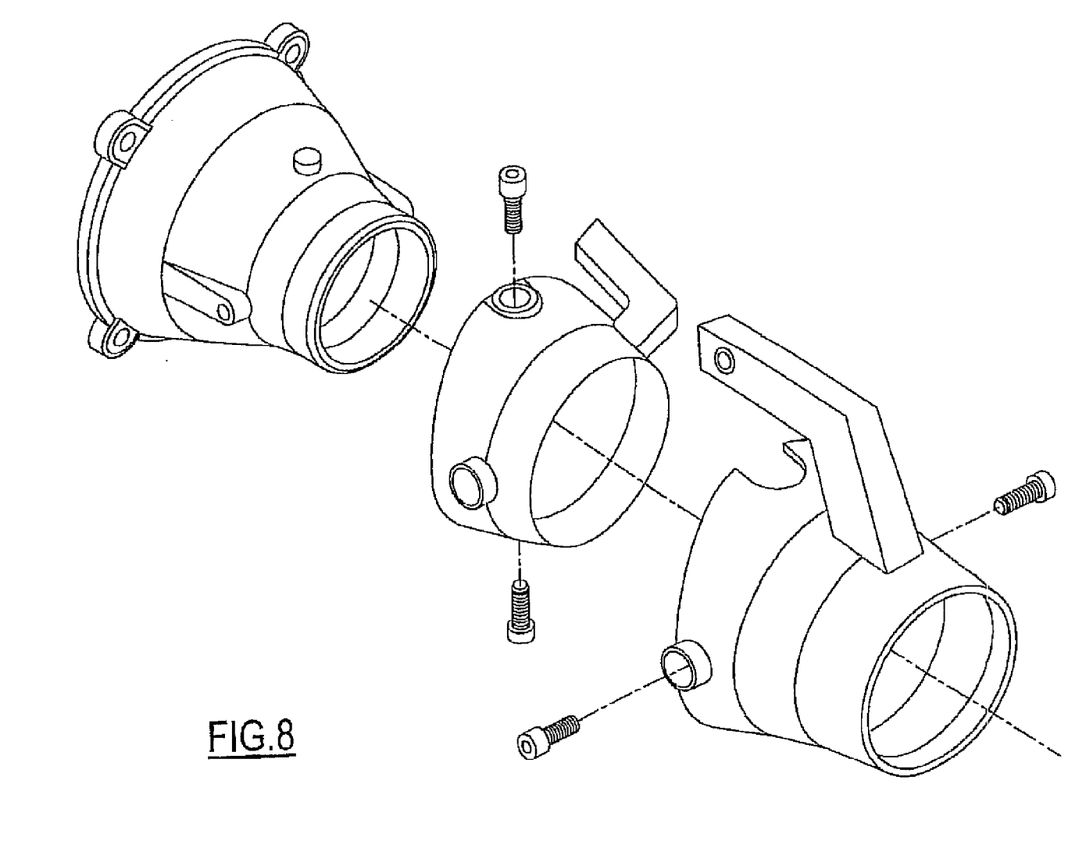
FIG. 8 is a perspective view of a water jet propulsory mechanism.

The vessel control system 12 may be adapted to waterjet drives. This requires waterjet nozzles capable of both vertical axis pitch articulation and horizontal axis steering articulation. Referring to FIG. 8 there is shown an example of a two-step nozzle design capable of dual-axis control, Additional suitable multi-axis nozzle actuation mechanisms can be integrated effectively.

The vessel control system, based on information received from an integrated depth finder or other similar suitable obstacle/terrain avoidance technology, can automatically raise/retract onboard propulsory mechanisms, overriding operator input and settings, when clearance becomes a concern; as would be the case in shallow water environments. For higher-speed operations, logic resident within the vessel control system 12 identifies slope changes in underwater landmasses and predicts probable distance till drive strike based on the relationship between speed, slope and drive depth. The vessel control system 12 automatically lowers/extends the propulsory mechanism(s) to normal operating position(s) once a safe environment signal is received.

The invention has been described in am illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A marine vessel control system comprising:
   at least one primary marine propulsory mechanism including an outboard providing a thrust vector and being movably attached to the vessel;
   a four bar linkage support bracket attached to the outboard capable of both positive and negative pitch trim and near uniform thrust vector height relative to the horizontal plane of the vessel;
   an actuating system coupled to the propulsory mechanism to manipulate the orientation of the thrust vector and affect the attitude of the vessel;
   at least one servo control;
   at least one attitude sensor providing a signal indicating the attitude of the vessel; and
   a central control computer operatively coupled to the actuating system, the servo control and the attitude sensor and controlling the actuation of at least one primary propulsion mechanism's thrust vector in response to the signal from the attitude sensor indicating the attitude of the vessel wherein attitude and motion damping in any or all of the pitch, roll and yaw axes of the vessel are controlled.

2. The marine vessel control system of claim 1 wherein the primary propulsion thrust vector is dynamically adjusted about a vertical axis.

3. The marine vessel control system of claim 2 wherein the primary propulsion thrust vector is dynamically adjusted about a horizontal axis.

4. The marine vessel control system of claim 1 including a plurality of primary marine propulsory mechanisms attached to the vessel.

5. The marine vessel control system of claim 4 wherein the thrust vector of each of the plurality of primary marine propulsory mechanisms may be differentially, dynamically independently articulated controlling vessel attitude and motion damping.

6. The marine vessel control system of claim 1 including a vessel hydrodynamic effector linked with the vessel control system, the hydrodynamic effector selected from hydrofoils, and planing devices.

7. The marine vessel control system of claim 1 including a user interface linked with the central control computer for inputting and displaying control parameters.

8. A marine vessel control system comprising:
   at least one primary marine propulsory mechanism including an outboard providing a thrust vector and being movably attached to the vessel;
   a four bar linkage support bracket attached to the outboard capable of both positive and negative pitch trim and near uniform thrust vector height relative to the horizontal plane of the vessel;
   at least one vessel hydrodynamic effector movably attached to the vessel;
   at least one servo control;
   an actuating system coupled to the propulsory mechanism and the at least one hydrodynamic effector actuating the propulsory mechanism and hydrodynamic effector relative to the vessel;
   at least one attitude sensor providing a signal indicating the attitude of the vessel; and
   a central control computer operatively coupled to the actuating system, the servo control and the attitude sensor and controlling the actuation of the propulsory mechanism and hydrodynamic effector to adjust thrust vector of the at least one primary marine propulsory mechanism and a position of the vessel hydrodynamic effector in response to the signal from the attitude sensor indicating the attitude of the vessel wherein attitude and motion damping in any or all of the pitch, roll and yaw axes of the vessel are controlled.

\* \* \* \* \*

UNITED STATES PATENT AND TRADEMARK OFFICE
CERTIFICATE OF CORRECTION

PATENT NO. : 7,565,876 B2
APPLICATION NO. : 11/426028
DATED : July 28, 2009
INVENTOR(S) : Jim Wilson and Scott Snow Page 1 of 1

It is certified that error appears in the above-identified patent and that said Letters Patent is hereby corrected as shown below:

On the title page item (57), line 7, ABSTRACT, replace "trust" with --thrust--

Column 2, line 64, replace "trust" with --thrust--

Column 4, line 3, replace "The" with --the--

Signed and Sealed this

Twentieth Day of October, 2009

David J. Kappos
*Director of the United States Patent and Trademark Office*